April 12, 1966 V. RASO ET AL 3,245,275
VARIABLE RATIO TRANSMISSION MECHANISM
Filed Nov. 19, 1963 9 Sheets-Sheet 1

VITO RASO
ROBERT P. THOMPSON
INVENTORS.

BY
Flam and Flam
ATTORNEYS.

FIG. 3.

VITO RASO
ROBERT P. THOMPSON
INVENTORS.

BY Flam and Flam
ATTORNEYS.

VITO RASO
ROBERT P. THOMPSON
INVENTORS.

BY

*Flam and Flam*
ATTORNEYS.

Vito Raso
Robert P. Thompson
INVENTORS.

BY Flam and Flam
ATTORNEYS.

April 12, 1966 V. RASO ETAL 3,245,275
VARIABLE RATIO TRANSMISSION MECHANISM
Filed Nov. 19, 1963 9 Sheets-Sheet 8

VITO RASO
ROBERT P. THOMPSON
INVENTORS.

BY Flam and Flam
ATTORNEYS.

VITO RASO
ROBERT P. THOMPSON
INVENTORS.

BY

Flam and Flam
ATTORNEYS.

United States Patent Office 3,245,275
Patented Apr. 12, 1966

3,245,275
VARIABLE RATIO TRANSMISSION MECHANISM
Vito Raso, Buena Park, and Robert P. Thompson, Lawndale, Calif., assignors to Emerson Electric Co., a corporation of Missouri
Filed Nov. 19, 1963, Ser. No. 324,793
10 Claims. (Cl. 74—230.17)

This invention relates to a variable ratio transmission mechanism utilizing variable diameter pulley structures on parallel shafts connected together by a flexible belt.

In such mechanisms, the variable diameter pulley structures include at least one pulley element movable along a shaft toward and away from a pulley element that occupies a relatively fixed axial position on the shaft. From time to time, it may be necessary to service the pulley structures or the bushings by the aid of which they are slidably supported. In known variable ratio transmission structures, the pulley structures are not readily accessible. One of the reasons for this is that it may be necessary to pull bearing structures. Another more important reason is that various linkages used to shift the pulley structures must be disassembled.

The primary object of this invention is to provide a new variable ratio transmission mechanism of this character in which the pulley structures are readily accessible for replacement or repair of parts. For this purpose, use is made of a shifting lever that slips into and out of place upon removal of an end cap closing the frame of the transmission, the shifting lever serving as the sole means holding the elements of the pulley structure on the shaft.

Another object of this invention is to provide a new control unit cooperable with a shifting lever of this character, and which can be optionally mounted on either side of the transmission frame.

In our prior application of Raso et al., Serial No. 140,520, filed September 25, 1961, now Patent No. 3,138,-032, entitled "Axially Adjustable Drive Mechanism" there is shown and described a split bushing made of plastic material mounted at the hub of the slidable pulley section. The bushing in turn is mounted upon the shaft. A key between the shaft and the pulley hub extends through the pulley split. An object of this invention is to provide simple means whereby the bushing is urged to surround the shaft in order to ensure against any rocking movement of the pulley section. For this purpose, resilient packing material surrounding the bushing provides the requisite constricting force for taking up clearance.

Another object of this invention is to provide a simplified bushing structure of this character that can be easily installed in the hub of the slidable pulley section.

This invention possesses many other advantages, and has other objects which may be made more clearly apparent from a consideration of one embodiment of the invention. For this purpose, there is shown a form in the drawings accompanying and forming a part of the present specification, and which drawings, unless as otherwise indicated, are true scale. This form will now be described in detail, illustrating the general principles of the invention; but it is to be understood that this detailed description is not to be taken in a limiting sense, since the scope of this invention is best defined by the appended claims.

Referring to the drawings.

Figure 3:
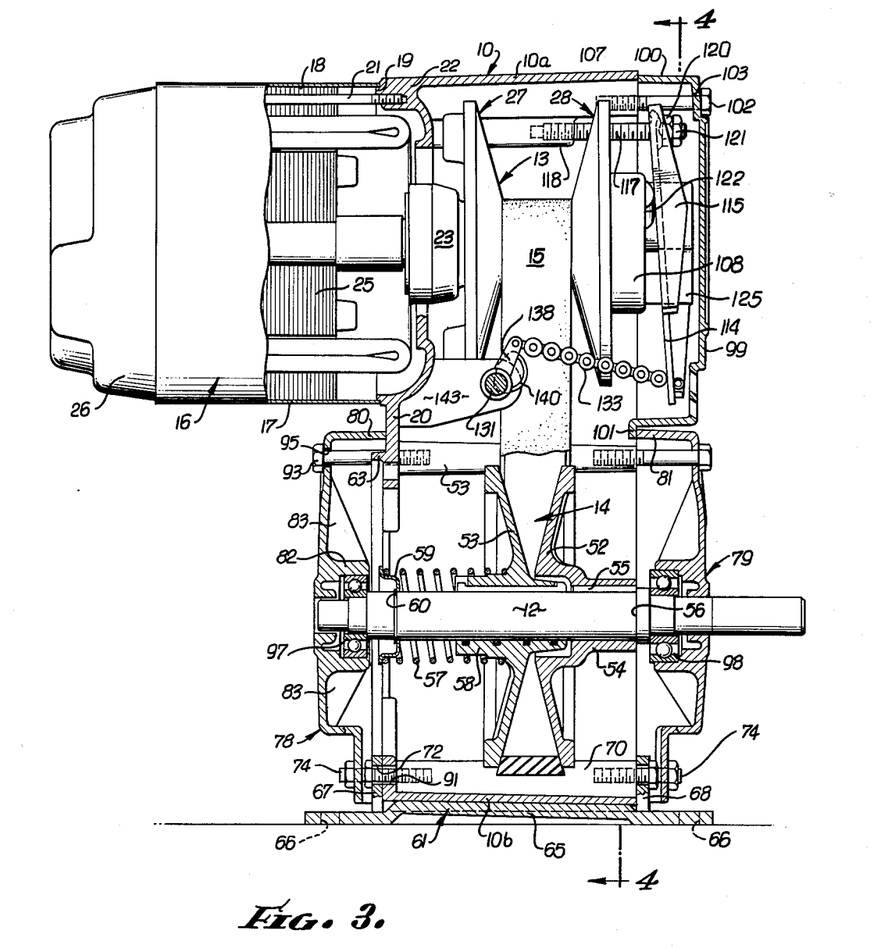
FIG. 3 is an enlarged axial sectional view taken along an offset plane corresponding to line 3—3 of FIG. 2, some of the parts being shown in elevation.
Figure 4:
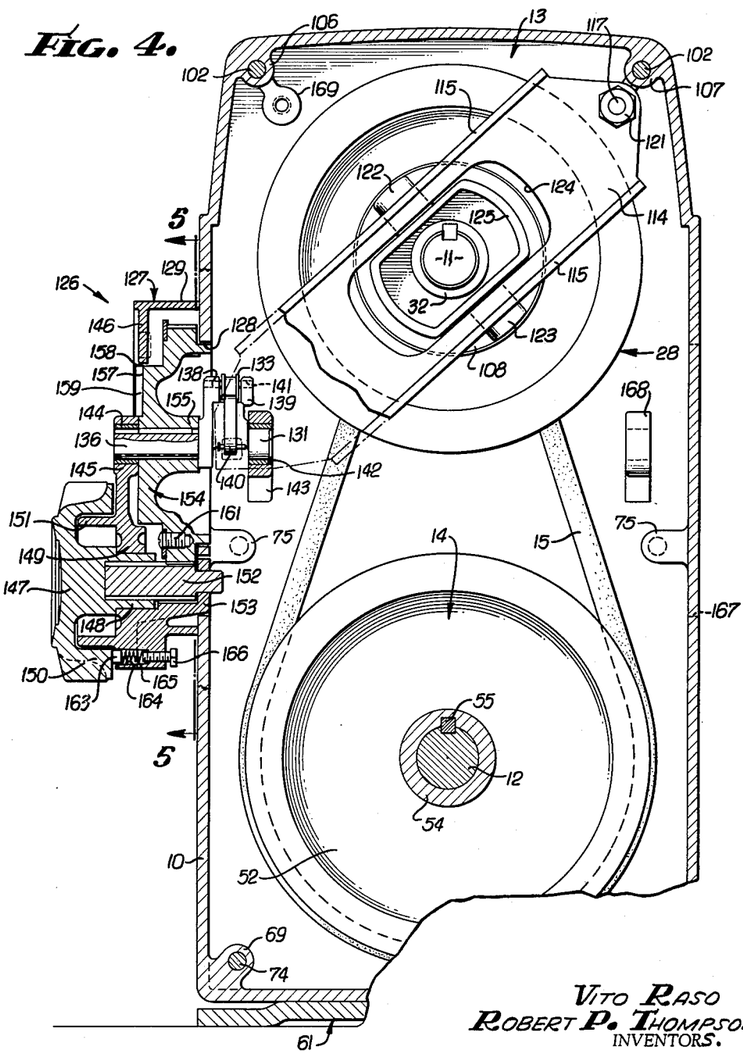
FIG. 4 is a fragmentary transverse sectional view taken along a plane corresponding to line 4—4 of FIG. 3.
Figure 8:
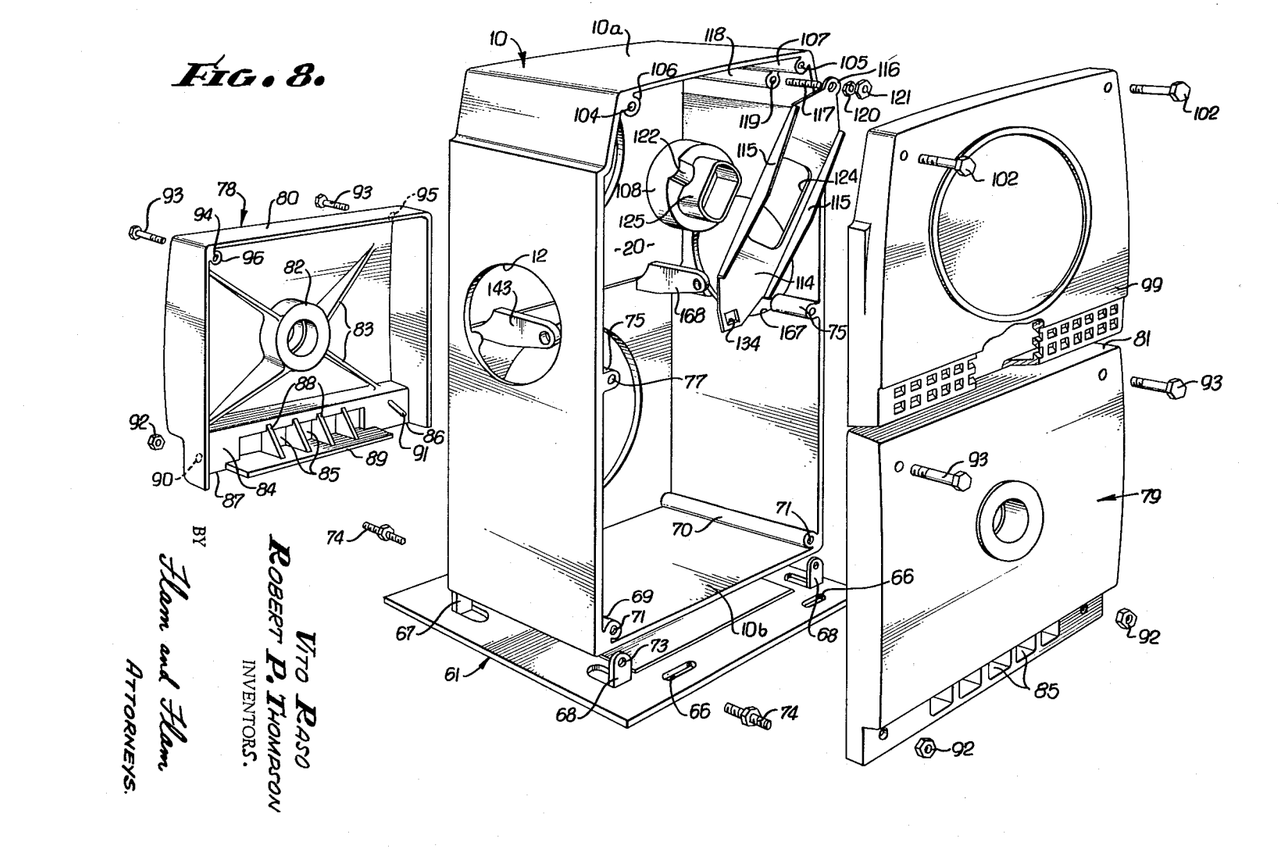
FIG. 8 is an exploded pictorial view illustrating the various elements of the frame.

In FIGS. 1, 2, 3, 4 and 8, there is illustrated a frame or casing 10 for a variable ratio transmission mechanism. As shown in FIGS. 4 and 8, the frame is generally of rectangular configuration, and so designed that it may be made as a die casting. For this purpose, the right-hand end of the frame 10 is entirely open. The other end of the frame 10 is partially closed in a manner hereinafter to be described. As shown in FIG. 3, the upper and lower walls 10a and 10b as well as the side walls are tapered so as to provide suitable mold draft.

A driving shaft 11 (FIGS. 3 and 6) and a driven shaft 12 (FIGS. 1 and 3) are supported for movement about spaced parallel axes in a manner hereinafter to be described. The shafts are connected together by the aid of variable diameter pulley structures 13 and 14 respectively mounted upon the shafts 11 and 12. A flexible V-belt 15 interconnects the pulley structures 13 and 14.

Figures 1, 2, 5:
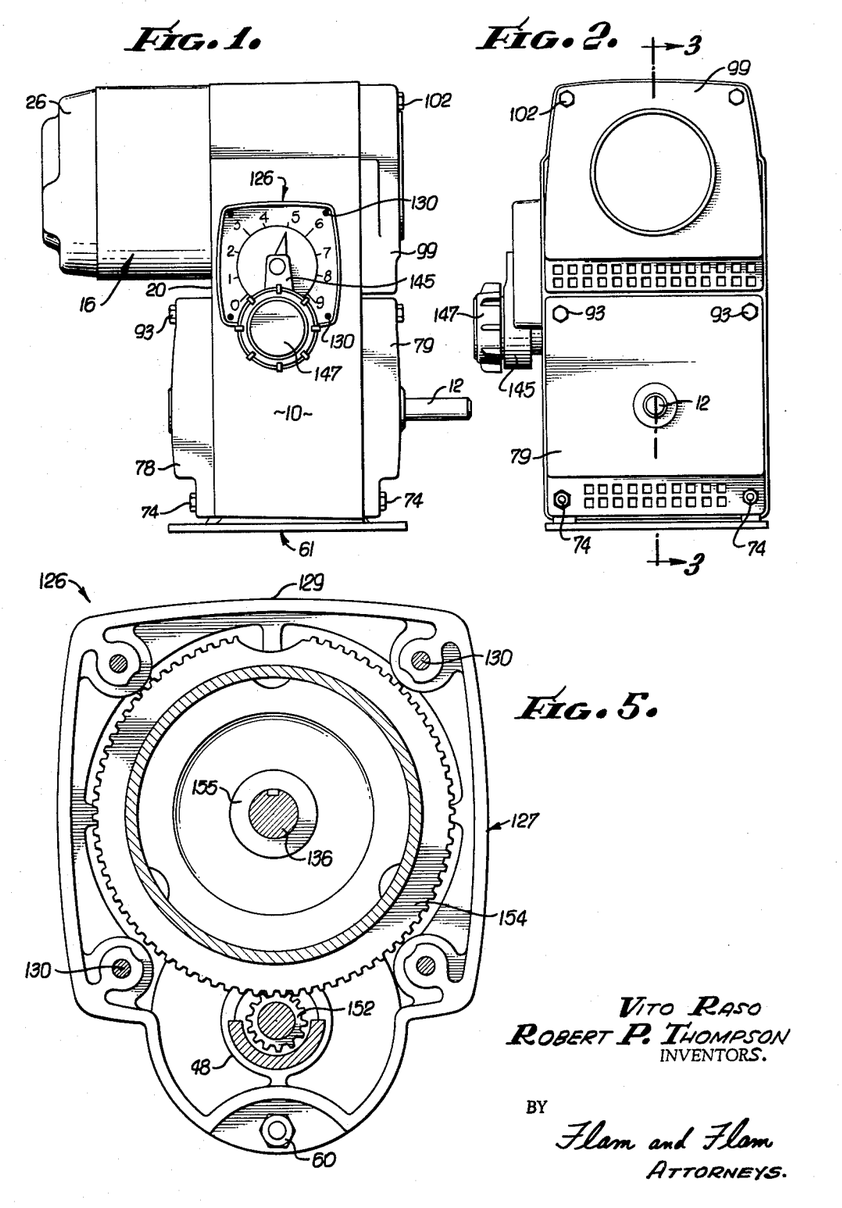
FIGURE 1 is a side elevational view of a variable transmission mechanism incorporating the present invention.
FIG. 2 is an end elevational view thereof.
FIG. 5 is a further enlarged transverse sectional view of the control unit taken along a plane corresponding to line 5—5 of FIG. 4.

The shaft 11 is operated by a motor 16 cantilevered at the left-hand end of the frame 10, as viewed in FIGS. 1 and 3. The motor includes a shell 17 in which stator laminations 18 are accommodated. The shell 17 telescopes over an annular flange or register 19 formed on the left-hand end wall 20 of the frame. A series of bolts 21 engaging threaded recesses 22 on the flange 19 secure the motor 16.

A bearing cup 23 (FIGS. 3 and 6) is integrally formed at the left-hand wall of the frame. The shaft 11 projects through a bearing 24 mounted in the cup. On the outer end of the shaft a rotor 25 is mounted. A bearing structure (not shown) is mounted in an end bracket 26 at the opposite end of the motor 16. The right-hand end of the shaft, as shown in FIG. 6, is free of direct support.

The pulley structure 13 on the driving shaft 11 includes, in this instance, a pair of opposed pulley elements 27 and 28, one of which 28 is slidable along the shaft 11. The edges of the belt 15 engage the conical faces of the respective pulley elements. As the pulley sections 27 and 28 are moved toward and away from each other, the belt 15 is forced outwardly or permitted to move inwardly, thus changing the effective pulley diameter.

Figure 6:
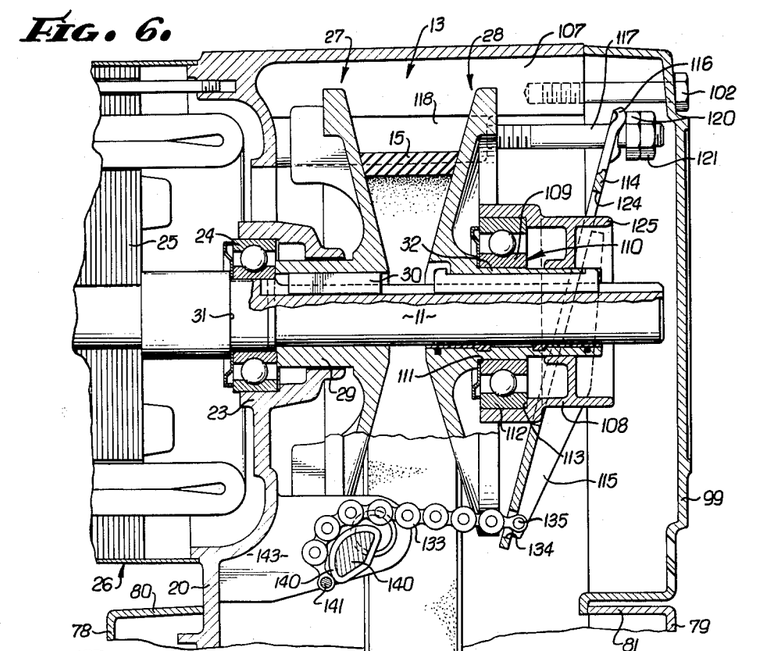
FIG. 6 is an enlarged fragmentary axial sectional view showing a part of the apparatus illustrated in FIG. 3 and with the parts in a different position.

The left-hand pulley element 27, as shown in FIG. 6, has a hub 29 that fits the shaft 11. A key 30 establishes a driving connection between the shaft 11 and the pulley element 27. The hub 29 projects into the bearing cup 23 and abuts the inner race of the bearing 24. The inner race of the bearing 24 in turn abuts a shoulder 31 formed on the shaft 11.

Figure 12:
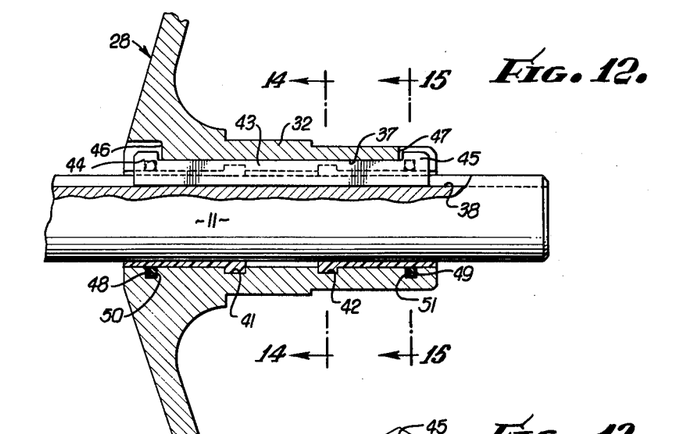
FIG. 12 is a further enlarged fragmentary axial sectional view showing the bushing structure for one of the slidable pulley elements.

The right-hand pulley element 28 has a hub 32 shown in detail in FIG. 12. Located between the hub 32 and the shaft 11 are companion flexible bushings 33 and 34 similar to those shown and described in the application of Vito Raso et al., Serial No. 140,520, filed September 25, 1961, and entitled "Axially Adjustable Drive Mechanism." The bushings 33 and 34 may be made of Nylatron, Delrin or other material having a relatively low coefficient of friction with respect to the metal of the shaft 11. The bushings 33 and 34 respectively have axially extending slots 35 and 36 capable of alignment with keyways 37 and 38 respectively formed on the interior surface of the hub 32 and the exterior surface of the shaft 11.

The bushing structures 33 and 34 are received in opposite ends of the hub 32. Their inner ends have integral collars 39 and 40 that are keyed in annular internal recesses 41 and 42 of the hub 32. A key 43 made of metal or plastic is accommodated in the keyways 37–38 and extends through the slots 35 and 36. The key 43 is locked to the hub 32. For this purpose, enlarged ends 44 and 45 of the key 43 project into recesses 46 and 47 at opposite ends of the hub 32.

Figures 13, 14, 15:
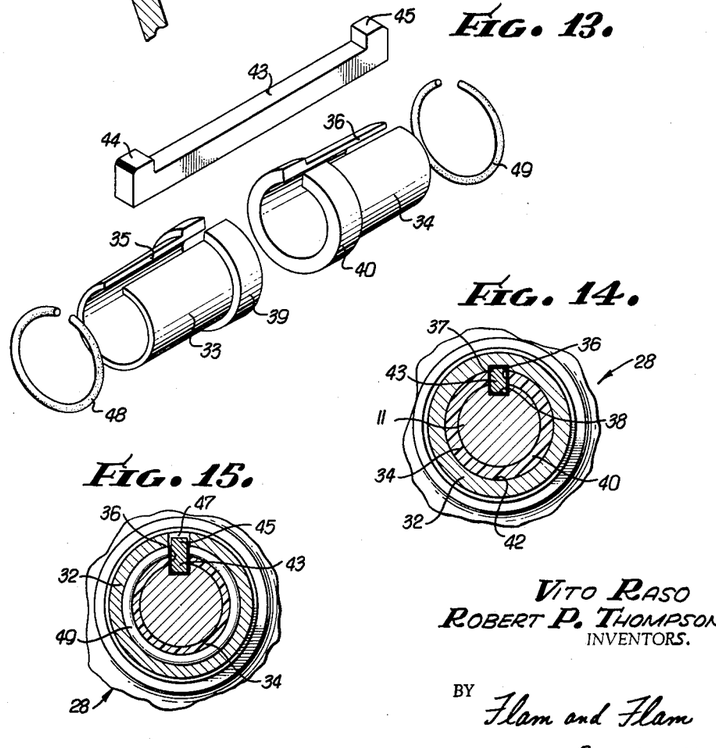
FIG. 13 is an exploded pictorial view illustrating components of the bushing structure.
FIGS. 14 and 15 are sectional views taken along planes corresponding, respectively, to lines 14—14 and 15—15 of FIG. 12.

The bushings 33 and 34 may be compressed so as to enable the collars 39 and 40 to enter the bore of the hub 32 and to snap into the recesses 41 and 42. The bushings 33 and 34 are sufficiently flexible so as to permit their construction for purposes of assembly. Yet the bushings may have resilient characteristics so that their expanding force normally keeps them in place. However, in order to ensure a close fit of the bushings on the shaft 11 thus to hold the pulley element 28 against tilting or any movement relative to the shaft 11 except in an axial direction, the bushings 33 and 34 are constricted about the shaft 11. For this purpose, split O-rings 48 and 49 are provided. These O-rings, which may be made of rubber-like material such as neoprene or of other suitable material, are accommodated in internal grooves 50 and 51 at opposite ends of the bore of the hub 32. The normal diameter of the rings 48 and 49 is slightly greater than the depth of the respective grooves 50 and 51. Accordingly, the rings 48 and 49 provide a constricting force on the bushings 33 and 34, thus ensuring a close fit between the pulley element itself and the shaft 11. The split in the rings 48 and 49 allows for passage of the key 43, as shown in FIG. 15. The rings 48 and 49 may be located at other positions along the bushings, or additional rings may be provided if desired.

Figure 16:
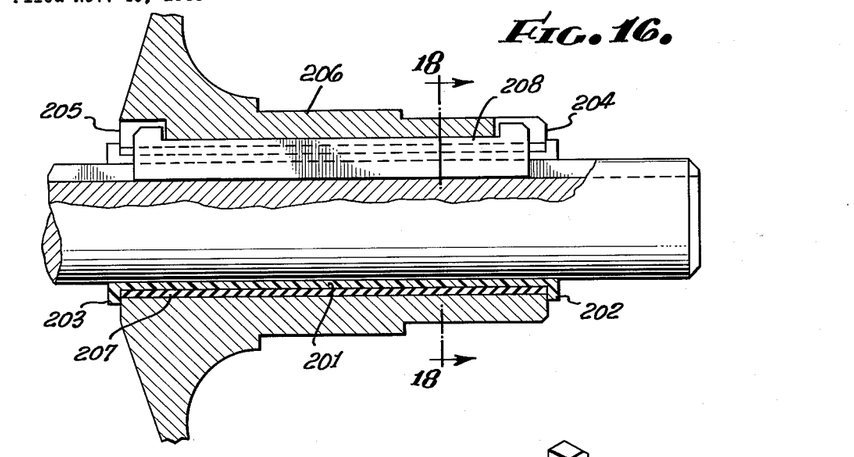
FIG. 16 is an axial sectional view similar to FIG. 12, illustrating a modified bushing structure.
Figures 17, 18:
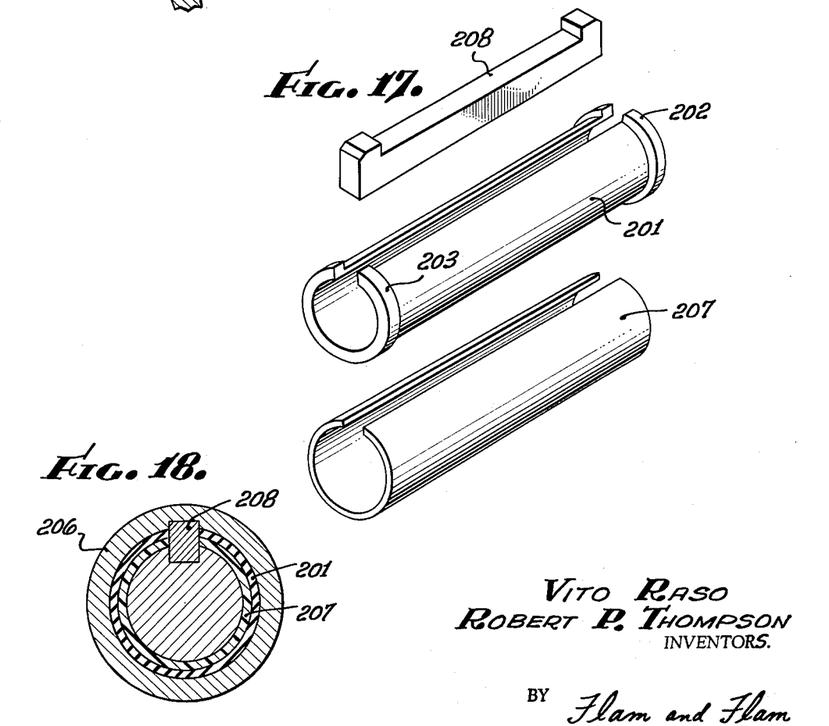
FIG. 17 is an exploded pictorial view illustrating components of the bushing structure shown in FIG. 16.
FIG. 18 is a transverse sectional view taken along a plane corresponding to line 17—17 of FIG. 16.

In the form of the invention illustrated in FIGS. 16, 17 and 18, a split bushing 201 is provided that has end collars 202 and 203 fitting about the end edges 204 and 205 of the bore of the pulley element 206. Interposed between the bushing 201 and the hub bore is a layer of resilient compressible material 207 such as rubber or plastic. Optionally the layer 207 may be bonded to the bore by suitable adhesive means.

When the shaft is installed, the layer 207 is resiliently compressed against the bore, and a constricting force is imposed upon the bushing throughout its entire length. Excess clearance between the bushing and the shaft is taken up.

The layer 207 is split to allow passage of a key 208.

The manner in which the pulley section 38 is moved axially will be described hereinafter.

The driven shaft 12, as shown in FIG. 3, has pulley elements 52 and 53. The right-hand pulley element 52 has a hub 54 that fits the shaft 12 and is coupled thereto, as by a key 55. The right-hand end of the hub 54 abuts a shoulder 56 formed on the shaft 12. The left-hand pulley structure 53 is mounted by a two-part bushing similar to that described in connection with the pulley element 28. A compression spring 57, which surrounds both the shaft 12 and the hub 58 of the pulley element 53, urges the pulley element 53 toward the companion pulley element 52. A spring retainer 59 that abuts a snap ring 60 mounted upon the shaft 12 forms a seat for the spring 57. In a well-understood manner, the pulley section 53 automatically adjusts to the setting of the pulley elements 27 and 28 on the driving shaft 11.

Figure 9:
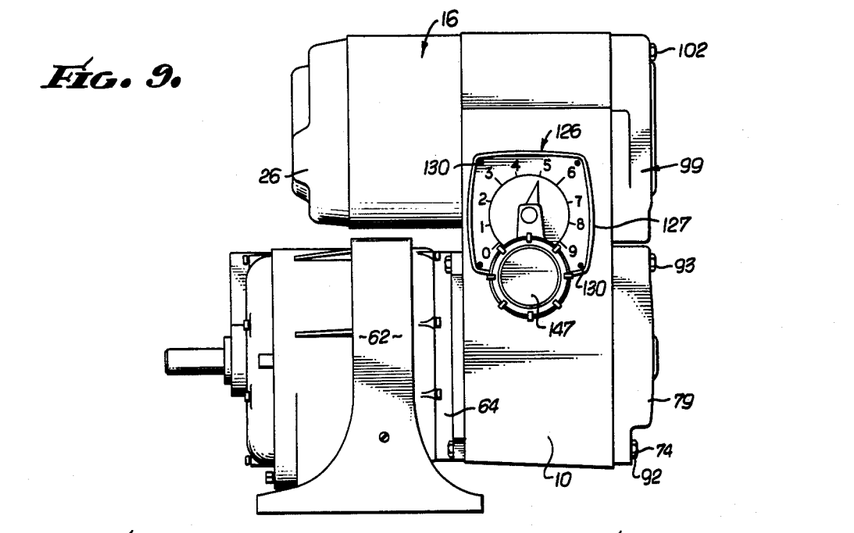
FIG. 9 is a side elevational view similar to FIG. 1, illustrating the transmission frame mounted on a gear mechanism.

The frame 10 itself has no base, mounting flange or mounting brackets. It may be mounted upon a separate base 61 or it may be mounted, as illustrated in FIG. 9, upon auxiliary equipment, such as a right-angle drive 62. The left-hand end wall 20 of the frame 10, as shown in FIG. 3, is provided with an annular flange or register 63 coaxial with the shaft 12. This flange 63 may be received within an annular groove formed on the frame 64 of the auxiliary mechanism 62 shown in FIG. 9. In a well-understood manner, the driven shaft of the variable ratio transmission mechanism is coupled to the input shaft of the auxiliary mechanism 62.

The angular position of the frame 10 about the auxiliary mechanism 62 may be adjusted.

In other installations, such as depicted in FIGS. 1 to 7, it may be desirable independently to mount the frame 10. The base 61 accomplishes this result. The base 61, which may be made of steel, is generally rectangular in configuration, as shown in FIG. 8. It has a central pad 65 (see also FIG. 3) that slopes slightly relative to the plane of the base 61. The end wall 10b rests upon the inclined pad 65. The plate 61 has a series of elongated apertures 66 (FIG. 8) through which suitable mounting bolts can be passed so as to secure the base to a suitable support.

The base 61 has four stamped-out projections or ears located beyond the corners of the pad 65. Two of the ears 67 overlie the edges at the left-hand lower corners of the frame 10, and the other two ears 68 overlie the edges at the right-hand open end of the frame 10.

Extending along the corners within the frame 10 are bosses 69 and 70. These bosses 69 and 70 have apertures 71 at opposite ends accessible at the end wall 20 and the opening of the frame. These apertures 71 are capable of registry with apertures 72 and 73 of the ears 67 and 68, respectively. By the aid of hex-collared studs, as at 74, the frame 10 is secured to the base 61.

Two bosses 75 and 76 extend along the interior of the frame at the mid-level thereof and have apertures 77 at opposite ends accessible, respectively, at the end wall 20 and the opposite open end of the frame. The apertures 77 and 71 at each end of the machine are located at corners of a square. Thus it is possible to mount the frame on a base not only in the vertical position illustrated in FIGS. 1 to 8, but also in either a right- or left-hand horizontal orientation. A right-hand orientation is depicted in FIGS. 13 and 14.

The apertured bosses 69, 70, 75, and 76 mount bearing brackets 78 and 79 for opposite ends of the driven shaft 12. The brackets 78 and 79 are identical and may be made from the same casting. They are generally of square configuration. The end brackets 78 and 79 have peripheral flanges 80 and 81 adapted to abut the ends of the frame 10.

The inside of one of the brackets 78 is shown clearly in FIG. 8. A bearing cup 82 is located at the center of the bracket 78 on the inside thereof. Ribs 83 reinforce the cup. One side of the bracket has an inwardly offset angular wall 84 along which ventilating openings 85 are situated. The edges of the flange 80 are arrayed substantially as a square, there being slots 86 and 87 at the corners of the flange along the offset wall 84. Ribs 88 define the separation between the ventilating openings 85 and serve to support the flange section 89 located between the slots 86 and 87.

The edges of the bracket 78 abut the end wall 20 and circumscribe the register or flange 63 which, in this instance, is unused. The lugs or ears 67 of the base 61 project through the slots 86 and 87 so as to be concealed by the bracket 78.

The hex-collared studs 74, which project outwardly from the bosses 69 and 70, pass through apertures 90 and 91 in the vertical portion of the offset wall 84. Nuts 92 secure the bracket to the hex-collared studs 74.

Cap screws 93 (see, for example, FIGS. 1 and 3) pass through apertures 94 and 95 at the other two corners of the bracket 78 and engage the apertures 77 of the frame.

The center of the bearing cup 82 must be accurately located in order suitably to align the driven shaft 12. For this purpose, the apertures 77 and 71 in the bosses are accurately located. The aperture 94 at one corner of the bracket 78 is extended through a boss 96 (FIG. 8) located along the corner of the flange 80. The boss 96 has an end surface adapted to abut the wall 20 about the corresponding aperture 77. Thus the aperture 94 has a substantially axial extent and it is sized so as guidingly to fit the shank of the bolt 93. Accordingly, one corner of the bracket is accurately located on the frame.

The aperture 91 opposite the boss 96 is elongated along the line joining the center of the bearing cup 82 and the center of the aperture 94. The width of the slot is carefully sized so as closely to fit the end of the corresponding stud 74. The aperture 91 thus ensures precise alignment of the center of the bearing cup 82. The screw 93 for the aperture 95 and the nut for the end of the stud 74 at the opposite corner are readily positioned and serve firmly to clamp the bracket in place.

The opposite bracket 79, instead of engaging an end wall, has the edges of its flange 81 engaging along the edges at the open end of the case or frame 10. The bracket 79 is accurately located in an identical manner, and the shaft 12 is thus accurately positioned by bearing structures 97 and 98 (FIG. 3) accommodated in the cups of the bearing brackets 78 and 79. The bracket 79 conceals the ears 68 of the mounting base 61.

The bracket 79 covers only about half of the frame opening. In order to complete the enclosure thereof, a cap 99 is provided. The cap has a peripheral flange 100, three sides of which fall along the side and top edges at the open end of the frame 10. The fourth side of the flange 100 is extended to provide a lip 101 caught by the edge of the flange 81 of the bracket 79. Machine screws 102 extend through apertures 103 in the upper corners of the cap 99 and enter apertures 104 and 105 (FIG. 8) formed in bosses 106 and 107 at the upper corners of the frame 10. The enclosure for the frame is thus completed.

Figure 10:
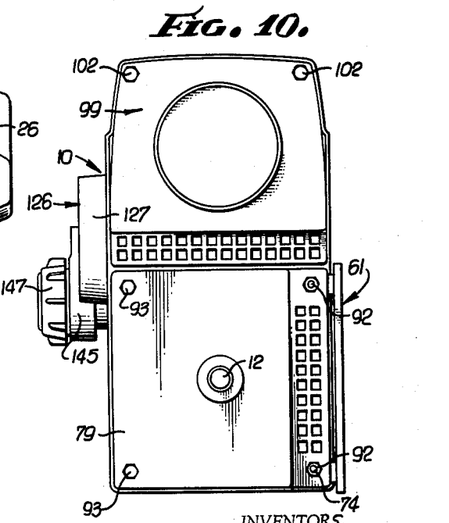
FIG. 10 is an end elevational view similar to FIG. 2, but illustrating the mounting base in an alternate position.
Figure 11:
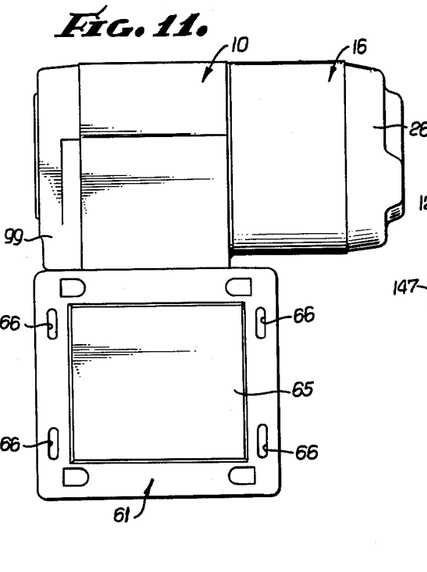
FIG. 11 is a side elevational view of the apparatus shown in FIG. 10.

For a right-hand or left-hand mounting of the frame on the base 61 and as shown in FIGS. 10 and 11, brackets 78 and 79 are turned ninety degrees so that the slots, as at 86 and 87, encompass the ears 67 and 68 of the base.

In order to adjust the transmission mechanism, the pulley element 28 carries a shift collar 108 (FIGS. 3 and 6). The shift collar 108 is telescoped over the hub 32. The inner race 109 of a ball bearing structure 110 is mounted upon the hub 32 and in abutting engagement with a shoulder 111. The outer race 112 of the bearing 110 is accommodated in an enlarged opening at the left-hand end of the collar 108 and in abutting relationship with an oppositely facing shoulder 113 formed therein. Thus, by virtue of the bearing structure 110, the shift collar 108 may be non-rotary; yet a connection between the collar and the pulley element 28 is established for its axial movement.

In order to increase the diameter of the pulley structure 13, the collar 108 is moved to the left. The thrust is so transmitted through the bearing structure 110 and the flexible belt 15 is caused accordingly to move. By relieving the thrust on the collar 108, the tension of the belt 15 causes the pulley element 28 to move to the right.

In order to control the movement of the collar 108, a shift lever 114 is provided. The lever 114 has reinforcing flanges 115 along opposite sides. One end of the lever has an apertured bearing projection 116 that forms a fulcrum for the lever 114. The projection 116 is mounted upon an outwardly extending stud 117 located at one of the upper corners of the frame 10. A supplemental boss 118, parallel to and terminating inwardly of the boss 107, provides an aperture 119 for mounting the stud 117. The apertured projection 116 bears against the inner surface of a nut 120 held in place by a lock nut 121. The lever 114 extends diagonally downwardly from the upper fulcrum corner, as illustrated in FIG. 4, and the central portion of the lever engages outwardly facing bearing projections 122 and 123 formed on the shift collar 108 on opposite sides of the axis of the shaft 11. The end of the lever 114 opposite the fulcrum 116, by means presently to be described, is moved inwardly or permitted to move outwardly, thus causing the shift collar 108 to adjust the pulley structure 113.

The shift lever 114 terminates adjacent the side wall opposite that at which it is fulcrumed. This end is movable between the positions illustrated in FIGS. 3 and 6, respectively. When the shift lever 114 is moved outwardly, as in FIG. 3, the pulley has a minimum effective diameter and the end of the lever is located in the cap 99. When the lever 114 is moved inwardly to the position of FIG. 6, the diameter of the pulley structure 13 is maximum and the end of the lever has moved inwardly along the side wall of the frame 10.

The bearing projections 122 and 123 are maintained substantially in appropriate angular position on opposite sides of the lever 114. For this purpose and for the purpose of holding the lever in its diagonal operative position, the collar 108 has a non-circular flange 125 that projects with slight clearance through a corresponding non-circular aperture 124 in the center of the lever 114. The collar 108 and the lever 114 are thus mutually restrained.

In order to move the lever 114, a control unit 126 (FIGS. 1, 4, 5 and 7) is provided. The control unit 126 includes a housing structure 127 that is secured about an aperture 128 in the side wall of the frame 10. This aperture is located substantially at the center of the frame about midway between the levels of the driving shaft 11 and the driven shaft 12. The center of the aperture 128 is located beyond the inward terminus of the path of movement of the end of the shifting lever 114.

The housing structure 127, as shown in FIGS. 1 and 5, is generally square. It has a peripheral flange 129 that engages the surface of the side wall of the frame 10 about the opening 128 and is fastened thereto by the aid of a plurality of screws 130 (FIGS. 1 and 5).

Figure 7:
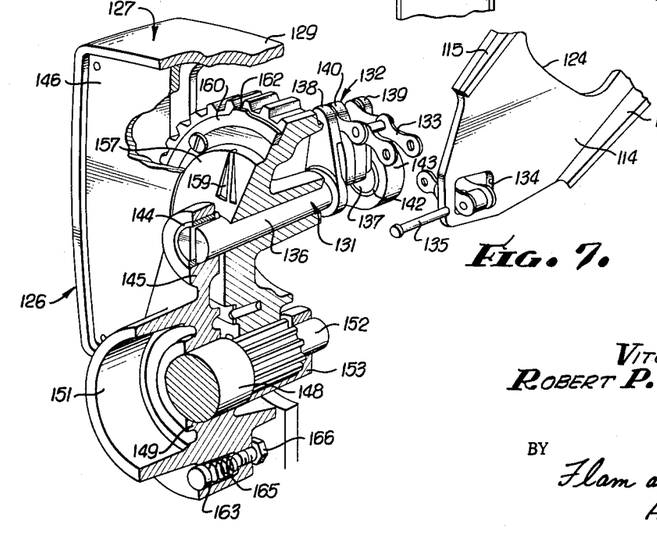
FIG. 7 is a fragmentary pictorial view showing some of the parts of the control unit broken away and in section.

A crankshaft 131 serves to move the shift lever 114. Thus the crankshaft 131 has an intermediate crank portion 132 in which one end of a sprocket chain 133 is secured. The other end of the sprocket chain 133 passes through a small square aperture 134 in the shift lever 114 (FIG. 7). A pin 135 passing through the end link of the chain secures the chain to the lever 114. The chain 133 extends along the inside of the frame 10 with suitable clearance.

The crankshaft 131 may be made as a die cast unit. The crankshaft 131 has two shaft parts 136 and 137 that are spaced from each other and joined by the crank part 132. The crank part 132 includes spaced ears 138 and 139 respectively attached to the shaft parts 136 and 137. A cam or toothless sprocket 140 is located between the ears 138 and 139 with its base and is integrally joined thereto. The end link of the sprocket chain 133 has its spacer collar and pin removed so that the parts of the end link are received within slots formed between the cam or toothless sprocket 140 and the respective ears 138 and 139. A pin 141 (FIGS. 3 and 4) is accommodated in both ears 138 and 139 and passes through the parts of the end link as well as through the cam part 140 to establish a suitable connection.

As illustrated in FIG. 6, the sprocket chain 133 wraps about the surface of the cam part 140 as the crankshaft 131 is rotated in a counterclockwise direction. The distance of the cam part from the axis of the crankshaft 131 is maximum at the place of connection of the chain 133. This distance gradually reduces. The configuration of the cam may be designed that the ratio of transmission may be any desired function of angular position of the crankshaft 131. For example, a linear relationship may be achieved.

The crankshaft part 137 is received in a bushing 142 in turn mounted in an arm 143 (see FIG. 3) projecting inwardly from the end wall 20 of the frame. The other part 136 of the crankshaft is extended axially and is mounted in a bearing bushing 144 in turn carried in an embossment 145 on the frontal wall 146 of the control unit housing 127.

In order to operate the crankshaft 131, a knob 147 (FIG. 4) is provided. The knob 147, which may be of die cast construction, has a reduced hub 148 that is journalled in an apertured boss 149 (see also FIG. 7) formed in the front wall 146 below the boss 145. The knob 147 has a peripheral flange 150 (FIG. 4) that telescopes over an outwardly projecting flange 151 formed on the housing 127.

Press-fitted in the hub 148 of the knob 147 is a pinion 152. The reduced end of the pinion 152 is journalled in an inwardly extending wall portion 153 (see also FIG. 5) of the housing 127. Ends of the teeth of the pinion 152 interfit grooves formed in the end of the knob hub 148 in order to establish a rotary coupling therebetween. A gear 154 is mounted in the housing 127 behind the frontal wall 146 and upon the crankshaft part 136 meshes with the pinion 152. The gear 154, which may also be of die cast construction, has a hub 155 keyed to the crankshaft part 136.

The angular poistion of the crankshaft 136 determine the setting of the variable ratio transmission mechanism. For purposes of indicating this setting, the gear 154 has a frontal surface 157 visible at a generally circular aperture 158 formed in the front wall 146 of the housing 127 about the boss 145. This surface 157 of the gear has a recess 159 (see also FIGS. 1 and 7) formed as a pointer to cooperate with scale markings on the housing wall 146 about the aperture 158.

In order to calibrate the indicator, the fulcrum point of the lever 148 may be shifted, as by adjustment of the nuts 120 and 121. For purposes of initial adjustment, the belt 15 is permitted to move to the minimum diameter position where it still adequately engages the pulley elements. The pointer is set at the zero scale mark. With all of the slack of the chain 133 taken up, the fulcrum point of the lever 144 is determined and set.

In order to prevent the belt from moving inwardly of the pulley structures beyond the minimum setting, a stop ring 160 is provided. The stop ring 160 is secured to the side face of the gear 154 by the aid of a plurality of clamping screws 161 (see FIGS. 4 and 7). The ring 160 has a projection 162 that extends above the root diameter of the teeth of the gear 146 and thus in a position to engage the teeth of the pinion 152 upon rotation of the gear 154. Thus the limit of movement of the gear is determined.

In order to maintain the setting determined by the knob 147 against creep, as for example induced by vibration, a small friction plug 163 is accommodated in an outwardly facing recess 164 in the lower wall 153 of the housing 147. The surface of the flange knob 150 is opposed to the recess 164 so as to be engaged by the plug 163. A small compression spring 165 in the recess urges the plug outwardly and to engage the knob 147. The screw 166, accessible behind the wall 153, adjusts the tension of the spring 165.

The control unit 126 can be mounted at either side of the frame 10, depending upon the requirements of the particular installation. For this purpose, an aperture 167, shown in dotted lines in FIG. 4, may be provided. A bearing arm 168 is provided in the frame casting for use, in this instance, for mounting the crankshaft. In this instance, the arm 143 will be idle. The shifting lever 114 is then mounted at the opposite upper corner of the frame 10, as at an apertured embossment 169. In this instance, the crankshaft 131 is angularly shifted through an angle of 180° relative to the gear 154. The gear 154 may be provided with two keyways for purposes of such selection. In either installation, clockwise movement of the crankshaft 131 decreases speed; hence the dials and pointer operate appropriately in both cases.

Figure 19:
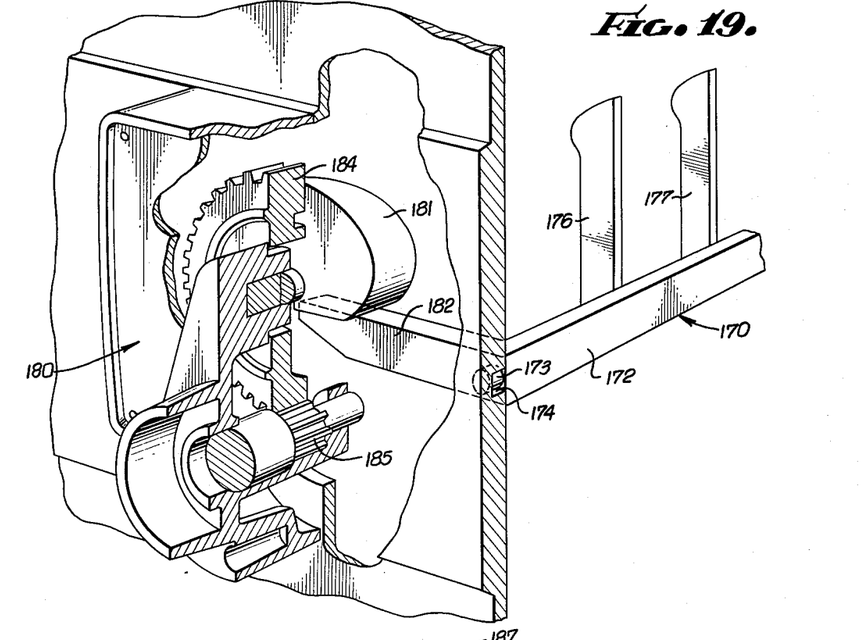
FIG. 19 is pictorial view of still another modified form of a control unit with associated mechanisms, part of the apparatus being broken away and shown in in section.
Figure 20:
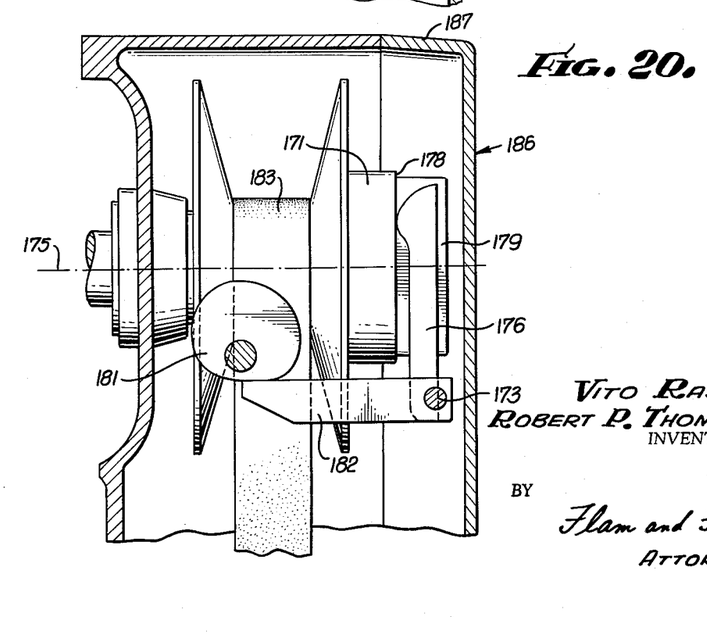
FIG. 20 is a fragmentary transverse sectional view illustrating the operating mechanism of FIG. 16.

In the form of the invention illustrated in FIGS. 19 and 20, a modified shift lever 170 is provided. The shift lever 170 cooperates with a shift collar 171 generally similar to the shift collar 32 of the previous form. The shift lever 170 is in the form of a bell crank lever, having a fulcrum bar 172 provided with pins 173 at opposite ends. These pins are received in bearing recesses 174 formed in the edges on opposite sides of the frame. The recesses 174 determine an axis of movement of the fulcrum bar 172 transverse to and beneath the axis 175 of the driving pulley structure.

Attached to the fulcrum bar 172 are two operating arms 176 and 177 having rounded ends that engage a shoulder 178 (FIG. 20) of the shift collar 171. A noncircular flange 179 of the shift collar 171 is accommodated between the arms and thus holds the collar against angular movement.

By rotating the fulcrum bar 172 about the axis of the pins 173, the shift collar 171 is moved inwardly and the ratio of transmission is correspondingly adjusted. In order to rotate the fulcrum bar 172, a control unit 180 is provided. It is mounted upon the side wall of the frame. The control unit 180 includes a cam 181. The cam 181 engages an arm 182 that projects from one side of the fulcrum bar 172. The arm 182 extends with clearance along the inside of the frame wall. The cam 181 lies above the arm 182. The tension of the belt 183 tends to rotate the fulcrum bar 172 in a clockwise direction and to move the arm 182 into engagement with the cam 181. The angular position of the cam 181 thus determines the ratio of transmission.

The cam 181 is carried on a gear 184 mounted upon the case of the control unit 180. The gear 184 is in turn operated by a pinion 185 connected to a handle (not shown).

On the other end of the fulcrum bar 172 is an arm identical to the arm 182. Accordingly, the control unit 180 may be mounted on either side of the frame as desired.

A bracket 186 appropriately secured to the open side of the frame has a flange 187 that closes the recesses 174 in which the bearing pins 173 are accommodated. Removal and replacement of the pulley structure can readily be accomplished without in any way disturbing the control unit 180. Thus, the end bracket 186 and the fulcrum lever 170 are readily moved. The collar 171 and the pulley structures are then freely removable.

The inventors claim:

1. In a variable ratio transmission: a shaft; a variable diameter pulley structure mounted on the shaft, and including a pulley element movably axially of the shaft; said pulley element having a bore substantially larger than the shaft; a bushing made of flexible material and having slot means whereby the bushing may be constricted, said bushing lining the bore, said bushing having a means for coupling the bushing and the pulley element for axial movement, said bushing being insertable in the bore by radial constriction thereof; a key in the bore rotatably coupling the pulley element and the shaft; and one or more resilient split rings for urging the split bushing to engage the shaft.

2. In a variable ratio transmission: a shaft; a variable diameter pulley structure mounted on the shaft, and including a pulley element movable axially of the shaft; said pulley element having a bore substantially larger than the shaft; a bushing made of flexible material and having slot means whereby the bushing may be constricted, said bushing lining the bore, said bushing having means for coupling the bushing and the pulley element for axial movement, said bushing being insertable in the bore by radial constriction thereof; a key in the bore rotatably coupling the pulley element and the shaft; said pulley bore having recesses opposed to the exterior surface of said bushings; and resilient compressible material in said recesses for urging the split bushing to engage the shaft.

3. In a variable ratio transmission: a shaft; a variable diameter pulley structure mounted on the shaft, and including a pulley element movable axially of the shaft; said pulley element having a bore substantially larger than the shaft; a bushing made of flexible material and having slot means whereby the bushing may be constricted, said bushing lining the bore, said bushing having provisions for coupling to the pulley element for axial movement therewith; and resilient means carried by the pulley element at the bore and exerting a constricting force on said bushing.

4. In a variable ratio transmission: a shaft; a variable diameter pulley structure mounted on the shaft, and including a pulley element movable axially of the shaft; said pulley element having a bore substantially larger than the shaft; a bushing made of flexible material and having an axially extending slot, said bushing lining the bore, said bushing having a projection cooperable with a recess adjoining the bore for coupling the bushing and the pulley element for axial movement, said bushing being insertable in the bore by radial constriction thereof; a separate key rotatably coupling the pulley element and the shaft and extending through the bushing slot; and resilient split rings mounted in spaced recesses of the bore for urging the split bushing to engage the shaft.

5. In a variable ratio transmission: a shaft; a variable diameter pulley structure mounted on the shaft, and including a pulley element movable axially of the shaft; said pulley element having a bore substantially larger than the shaft; a pair of bushings made of flexible material received in opposite ends of the bore; each of said bushings having an axial slot and a collar at its inner end; said bore having a first pair of annular recesses spaced inwardly from the respective ends of the bore for receiving the collars; said bore also having a second pair of annular recesses respectively extending about the outer ends of the bushings; a key in the bore rotatably coupling the pulley element and the shaft; said resilient rings in the second pair of annular recesses urging the bushings to engage the shaft.

6. In a variable ratio transmission: a shaft; a variable diameter pulley structure mounted on the shaft, and including a pulley element movable axially of the shaft; said pulley element having a bore substantially larger than the shaft; a bushing made of flexible material and having slot means whereby the bushing may be constricted; a liner made of compressible resilient material between the bushing and the bore; said liner imposing a constricting force upon said bushing for urging the bushing into engagement with the shaft.

7. In a variable ratio transmission mechanism: a frame; said frame having an end wall and edges forming an opening opposite said end wall; a shaft; bearing means located at said end wall for supporting said shaft, the other end of said shaft being free and located at said opening; a pulley structure mounted on said shaft and including a pulley element axially slidable along the shaft and removable through said opening; a shift lever; said frame having bearing means mounting said shift lever for movement at said opening about an axis spaced from and transverse to the axis of said shaft; detachable means confining said shift lever in the bearing means of said frame; said lever being freely removable through said opening; said lever having one arm located adjacent said shaft and movable in an arc substantially paralleling the shaft upon angular movement of said lever; means for transmitting inward thrust of said one arm to said pulley element; said lever having another arm extending inwardly of the frame in spaced relationship to said shaft; a cam mounted on said frame and engaged by said other arm, said cam limiting angular movement of the lever in a direction corresponding to outward movement of said pulley element.

8. In a variable ratio transmission mechanism: a frame; said frame having an end wall and edges forming an opening opposite said end wall; a shaft; bearing means located at said end wall for supporting said shaft, the other end of said shaft being free and located at said opening; a pulley structure mounted on said shaft and including a pulley element axially slidable along the shaft and removable through said opening; a shift lever; said shift lever having bearing members; a cap overlying said edges and detachably secured to said frame; means forming bearings between the cap and said frame edges and for mounting said shift lever on said frame for pivotal movement about an axis spaced from said shaft; said lever being freely removable from the frame when the cap is detached; said lever having one arm located adjacent said shaft and movable in an arc substantially paralleling the shaft upon angular movement of said lever; means for transmitting inward thrust of said one arm to said pulley element; said lever having another arm extending inwardly of the frame in spaced relationship to said shaft; a cam mounted on said frame and engaged by said other arm, said cam limiting angular movement of the lever in a direction corresponding to outward movement of said pulley element.

9. In a variable ratio transmission mechanism: a frame; said frame having an end wall and edges forming an opening opposite said end wall; a shaft; bearing means located at said end wall for supporting said shaft, the other end of said shaft being free and located at said opening; a pulley structure mounted on said shaft and including a pulley element axially slidable along the shaft and removable through said opening; a shift lever; means mounting said shift lever for movement at said opening about an axis spaced from and transverse to the axis of said shaft; said lever being freely removable through said opening; said lever having one arm located adjacent said shaft and movable in an arc substantially paralleling the shaft upon angular movement of said lever; means for transmitting inward thrust of said one arm to said pulley element; said lever having another arm extending inwardly of the frame in spaced relationship to said shaft; a cam mounted on said frame and engaged by said other arm, said cam limiting angular movement of the lever in a direction corresponding to outward movement of said pulley element; said cam having a configuration to produce a linear relationship between angular position of the cam and ratio of transmission.

10. In a variable ratio transmission mechanism: a frame; said frame having an end wall and edges forming an opening opposite said end wall; a shaft; bearing means located at said end wall for supporting said shaft, the other end of said shaft being free and located at said opening; a pulley structure mounted on said shaft and including a pulley element axially slidable along the shaft and removable through said opening; a shift lever having a fulcrum bar extending across said opening in spaced relationship to said shaft; the ends of said fulcrum bar having bearing members; a cap overlying said edges and detachably secured to said frame; means forming bearing between the cap and said frame edges receiving said bearing members for mounting said fulcrum bar on said frame for pivotal movement about an axis spaced from said shaft and transverse thereto; said shift lever having a pair of operating arms at opposite ends of the fulcrum bar extending inwardly along opposite sides of the frame; said lever also having shift arm means located adjacent said shaft and movable in an arc substantially paralleling said shaft upon angular movement of said fulcrum bar; means for transmitting thrust of said shift arm means to said pulley element; a cam selectively mounted at one side of the frame and engaged by one of said operating arms, said cam limiting angular movement of the fulcrum bar in a direction corresponding to outward movement of said pulley element; said shift lever being freely removable from said frame upon detachment of said cap.

References Cited by the Examiner
UNITED STATES PATENTS

| | | | |
|---|---|---|---|
| 2,277,004 | 3/1942 | Reeves | 74—230.17 |
| 2,433,150 | 12/1947 | Palm | 74—230.17 |
| 2,613,545 | 10/1952 | Reeves | 74—230.17 |
| 2,937,042 | 5/1960 | Wilder | 74—230.17 |
| 2,992,844 | 7/1961 | Williams | 74—230.17 |

DON A. WAITE, *Primary Examiner.*